United States Patent
Wirasinghe et al.

(10) Patent No.: US 7,412,565 B2
(45) Date of Patent: Aug. 12, 2008

(54) MEMORY OPTIMIZATION FOR A COMPUTER SYSTEM HAVING A HIBERNATION MODE

(75) Inventors: Marco Wirasinghe, Sunnyvale, CA (US); Randy P. Stanley, Aptos, CA (US)

(73) Assignee: Intel Corporation, Santa Clara, CA (US)

( * ) Notice: Subject to any disclaimer, the term of this patent is extended or adjusted under 35 U.S.C. 154(b) by 459 days.

(21) Appl. No.: 10/643,826

(22) Filed: Aug. 18, 2003

(65) Prior Publication Data

US 2005/0086551 A1  Apr. 21, 2005

(51) Int. Cl.
*G06F 12/00* (2006.01)
(52) U.S. Cl. .................. 711/122; 711/112; 713/2
(58) Field of Classification Search ............. 711/113, 711/119, 142, 154; 713/320, 300
See application file for complete search history.

(56) References Cited

U.S. PATENT DOCUMENTS

| | | | |
|---|---|---|---|
| 5,519,831 A | | 5/1996 | Holzhammer |
| 5,809,223 A | * | 9/1998 | Lee et al. .................. 714/4 |
| 7,000,102 B2 | | 2/2006 | Kumar et al. |
| 7,334,122 B2 | * | 2/2008 | Burokas et al. ............ 713/2 |
| 2004/0034802 A1 | * | 2/2004 | Hamilton ................. 713/300 |
| 2004/0153694 A1 | * | 8/2004 | Nicholson et al. ......... 714/4 |
| 2004/0236974 A1 | * | 11/2004 | Brown et al. ............ 713/320 |

OTHER PUBLICATIONS

Uhruski, et al., "Multi-agent Computing System in a Heterogeneous Network", © 2002 IEEE, p. 1-6.*

* cited by examiner

*Primary Examiner*—Brian R Peugh
(74) *Attorney, Agent, or Firm*—Blakely, Sokoloff, Taylor & Zafman LLP

(57) ABSTRACT

A computer system that increases performance and reduces power consumption is described. Specifically, the system writes the contents of the system to a non-volatile memory cache before powering down. After repowering the system, the system initiates the load sequence from the memory cache.

12 Claims, 5 Drawing Sheets

MEMORY OPTIMIZATION FOR A COMPUTER SYSTEM HAVING A HIBERNATION MODE

FIELD OF THE INVENTION

The present invention pertains to the field of computer design. More particularly, the present invention relates to a method for memory optimization of a computer system.

BACKGROUND OF THE INVENTION

A computer system typically comprises a main memory and a secondary memory. Main memory or random access memory (RAM) refers to the physical system that is internal to the computer. The computer manipulates only the data that is in main memory. Therefore, programs that are executed and files that are accessed are typically copied into main memory. When the computer system is powered off, the data in main memory is typically not retained. The amount of main memory in a computer system determines how many programs can be executed at one time and how much data can be readily available to a program.

In contrast to main memory, the data in secondary memory is typically retained even after the system is powered off. Secondary memory allows large amounts of data to be stored. Examples of secondary memory include mass storage devices such as hard disks, floppy disks, optical disks, and tapes.

Computer systems set to a "hibernate" mode typically store the contents of main memory and other devices to secondary memory prior to powering down the system. After the system is powered back up, the computer is restored to the same state as the system was in prior to power down.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When a system is placed in a hibernation mode, the state of the computer system is stored to a first non-volatile memory or hard disk drive. The computer system state may comprise a central processing unit (CPU), a main memory, a secondary memory, and a chipset. The state of the computer system may be defined by the operating system and contents of the CPU, the RAM, and other devices of the system.

Upon repowering or waking the system from hibernation, the system initiates a load sequence from the hard disk drive. To reduce power consumption and to improve performance, the state of the computer may be saved to and loaded from a second non-volatile memory or level 3 cache rather than the hard disk drive.

Figure 1A:
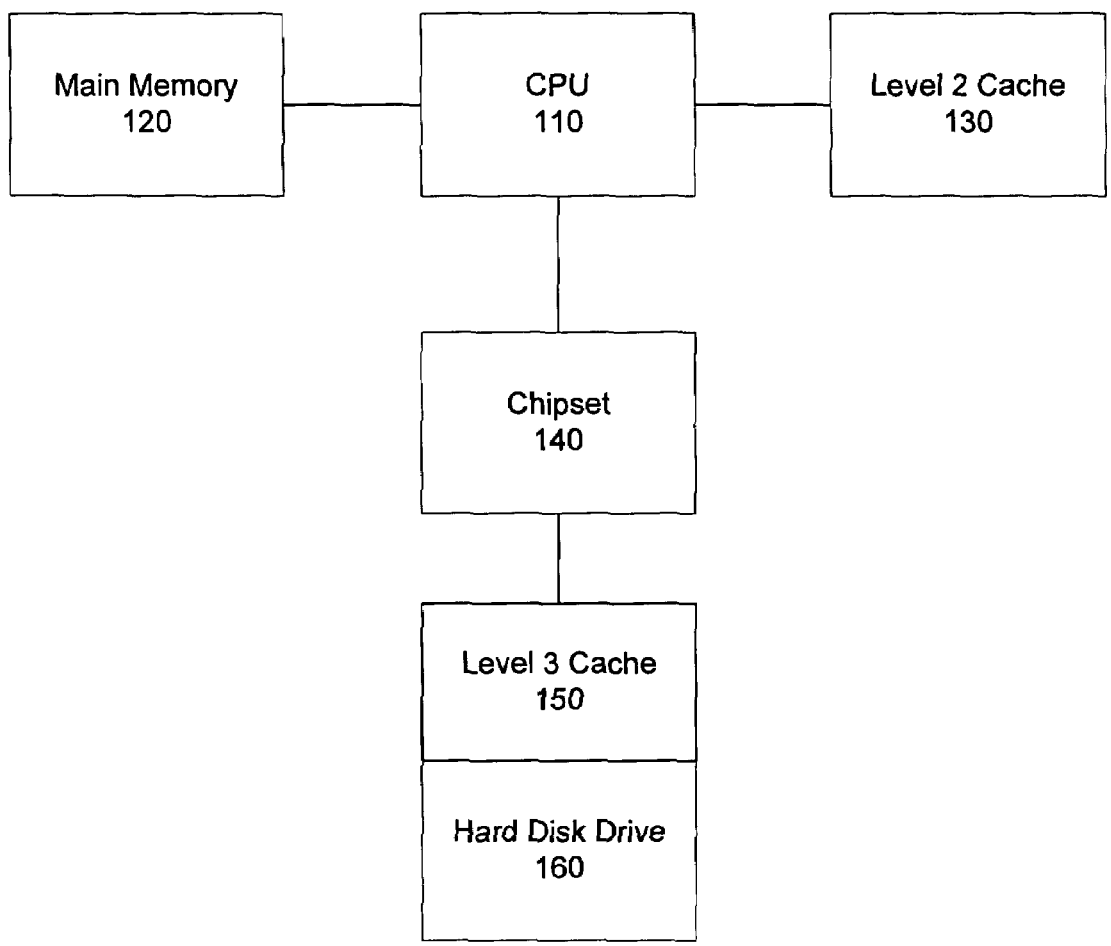
FIG. 1A is an embodiment of a computer system having a cache for a hibernate process.

A system for reducing power consumption and to improve performance during hibernation is depicted in FIG. 1A. The system may be a mobile computer system or a desktop computer system. CPU 110 is coupled to main memory 120, level 2 cache 130, and chipset 140. The CPU 110 may comprise an on-chip level 1 cache. The level 2 cache 130 temporarily stores data and instructions transferred to and from the CPU 110. Chipset 140 is coupled to a hard disk drive 160. Hard disk drive 160 comprises a level 3 cache 150. The level 3 cache 150 may have a smaller storage capacity than the hard disk drive 160.

For one embodiment of the invention, the level 3 cache 150 may be a non-volatile memory logically coupled to the hard disk drive 160. The level 3 cache 150 may have the same address configuration as the hard disk drive 160. In other words, contents of the system written to level 3 cache 150 are written to hard disk drive 160 via a transparent write-through process.

Figure 1B:
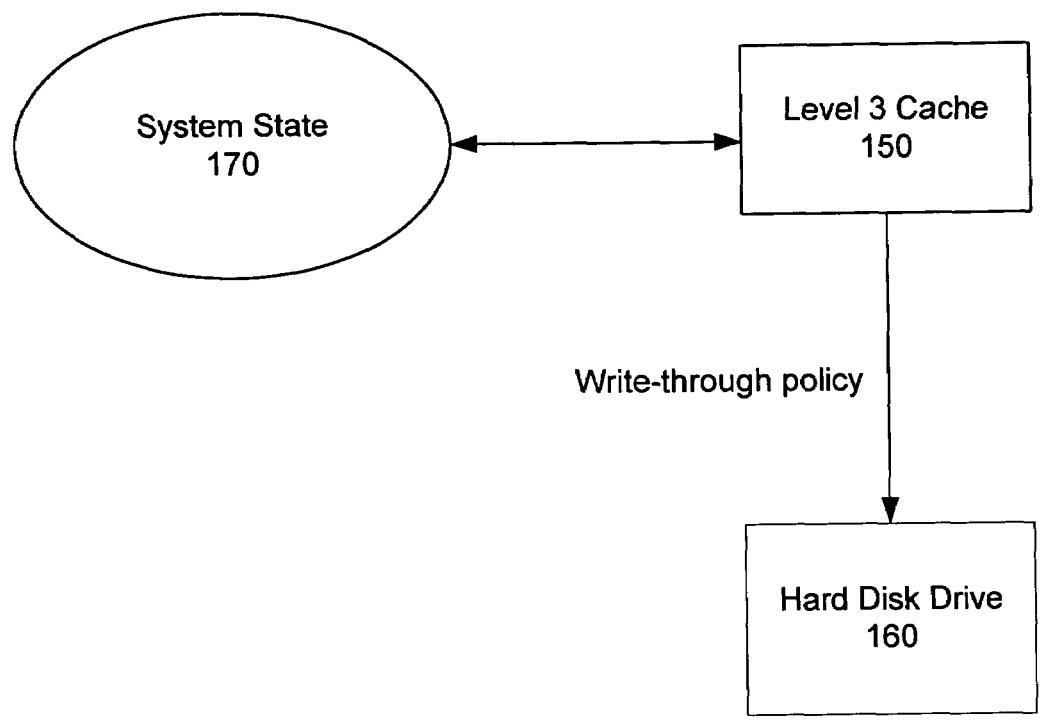
FIG. 1 B is a diagram of a hibernation process.

FIG. 1B depicts a diagram of the embodiment of the hibernation process described above. The system state 170 is written to level 3 cache 150 when the user requests that the system be placed in a hibernation mode. The system state 170 is also written to hard disk drive 160 in a write-through process. When the system is awoken from the hibernation mode, the system state 170 is loaded from the level 3 cache.

For this embodiment of the invention, the level 3 cache 150 may have a storage capacity in the hundreds of megabytes. For example, the level 3 cache 150 may have a storage capacity between 50-2000 megabytes. For another embodiment of the invention, the level 3 cache 150 may have a storage capacity greater than 700 megabytes. The state of the system may be loaded directly from the level 3 cache 150 after hibernation without having to access the hard disk drive 160. Loading the state of the system from the level 3 cache 150 is faster and consumes less power than loading the state of the system from the hard disk drive 160. For yet another embodiment of the invention, to further reduce loading time after being awoken from hibernation, the level 3 cache 150 may continue spinning even after powering off the system.

Figure 2:
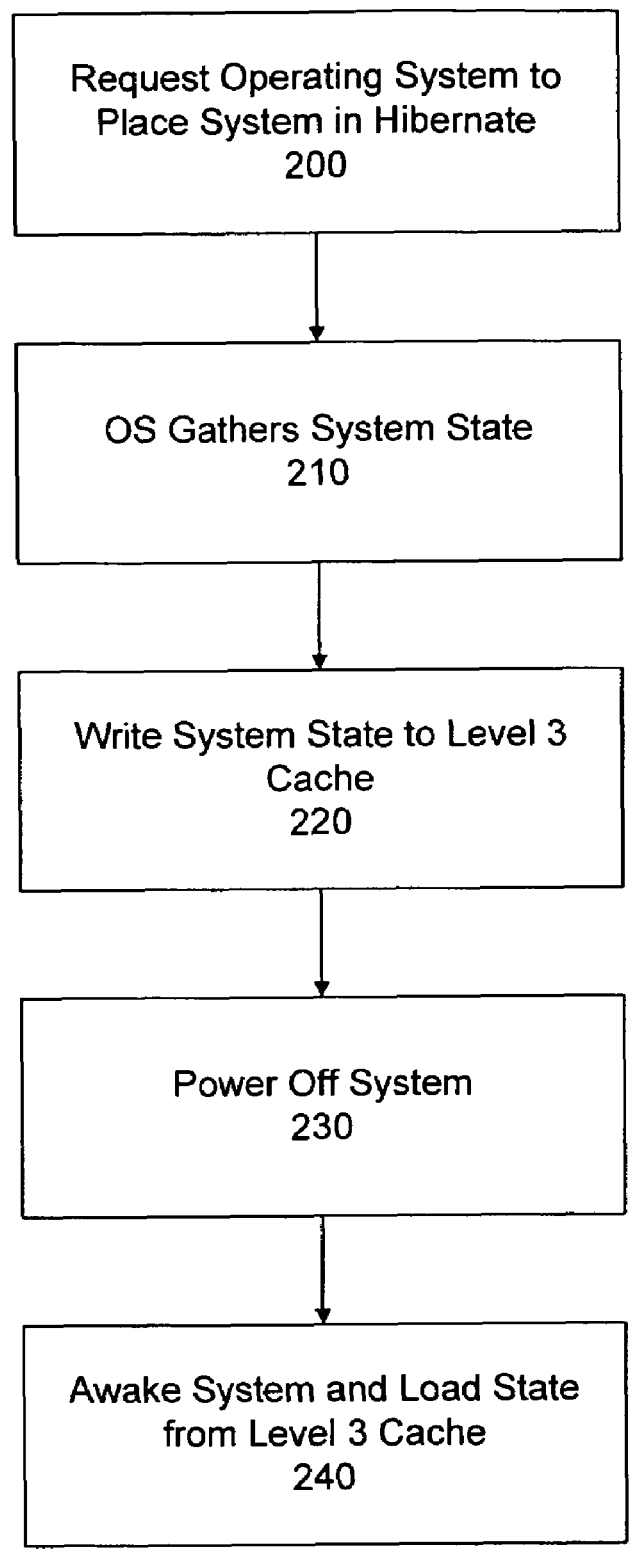
FIG. 2 is a flowchart of a computer system that optimizes a hibernate process.

FIG. 2 depicts a flowchart of the hibernation process. In operation 200, the user requests for the operating system to place the computer system in a hibernation mode. The operating system subsequently gathers the state of the system in operation 210. The state of the system may include the contents of the CPU 110, the contents of main memory 120, and the operating system itself. The state of the system is then written to the level 3 cache 150 in operation 220. A copy of the state of the system may be stored in hard disk drive 160. Finally, the system is safely powered off in operation 230.

Once the system is awoken from hibernation, the state of the computer system prior to hibernation is loaded from the level 3 cache 150 in operation 240. Thus, contents of the CPU 110, the contents of the main memory 120, and the operating system may be reloaded to the computer system without having to access the hard disk drive 160.

Figure 3:
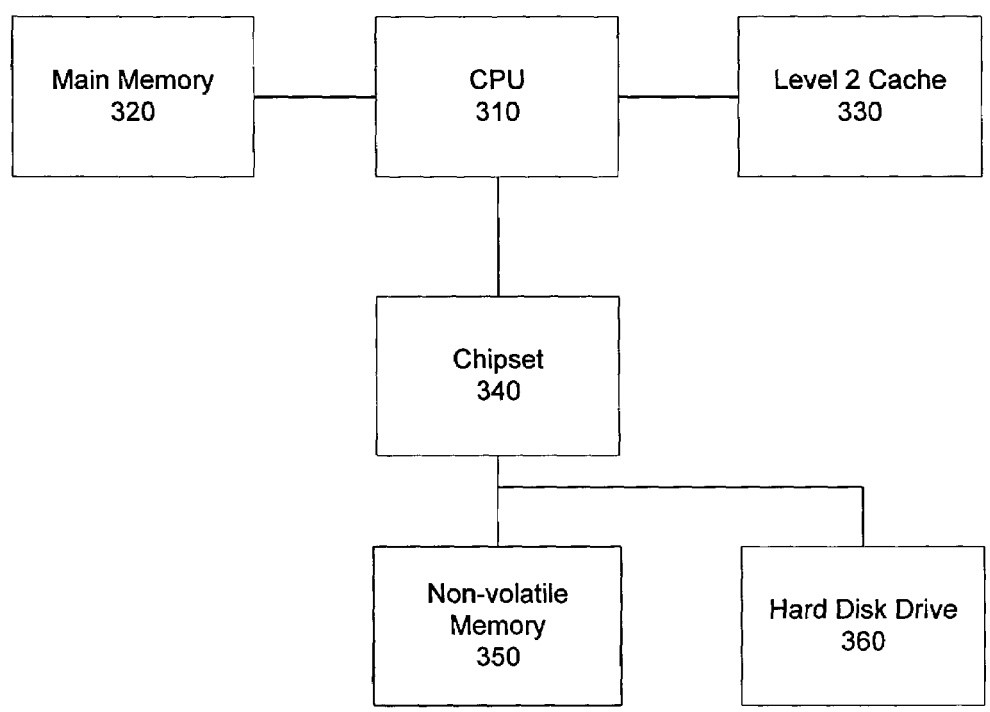
FIG. 3 is another embodiment of a computer system having a cache for a hibernate process.

For another embodiment of the invention, FIG. 3 depicts a non-volatile memory that is separately addressable from the hard disk drive. CPU 310 is coupled to main memory 320, level 2 cache 330, and chipset 340. The CPU 310 may comprise an on-chip level 1 cache. The level 2 cache 330 temporarily stores data and instructions transferred to and from the CPU 310. Chipset 340 is coupled to non-volatile memory 350 and a hard disk drive 360.

When the user requests to place the computer system of FIG. 3 in the hibernation mode, the state of the computer system is stored into the hard disk drive 360. In addition, a hibernate mode driver writes the system state to the non-volatile memory 350. Alternatively, the system state may be written to the non-volatile memory 350 without also being stored in the hard disk drive 360. The computer system may then be safely powered down. After the system is powered on again, the computer system loads the system state from the non-volatile memory 350.

Figure 4:
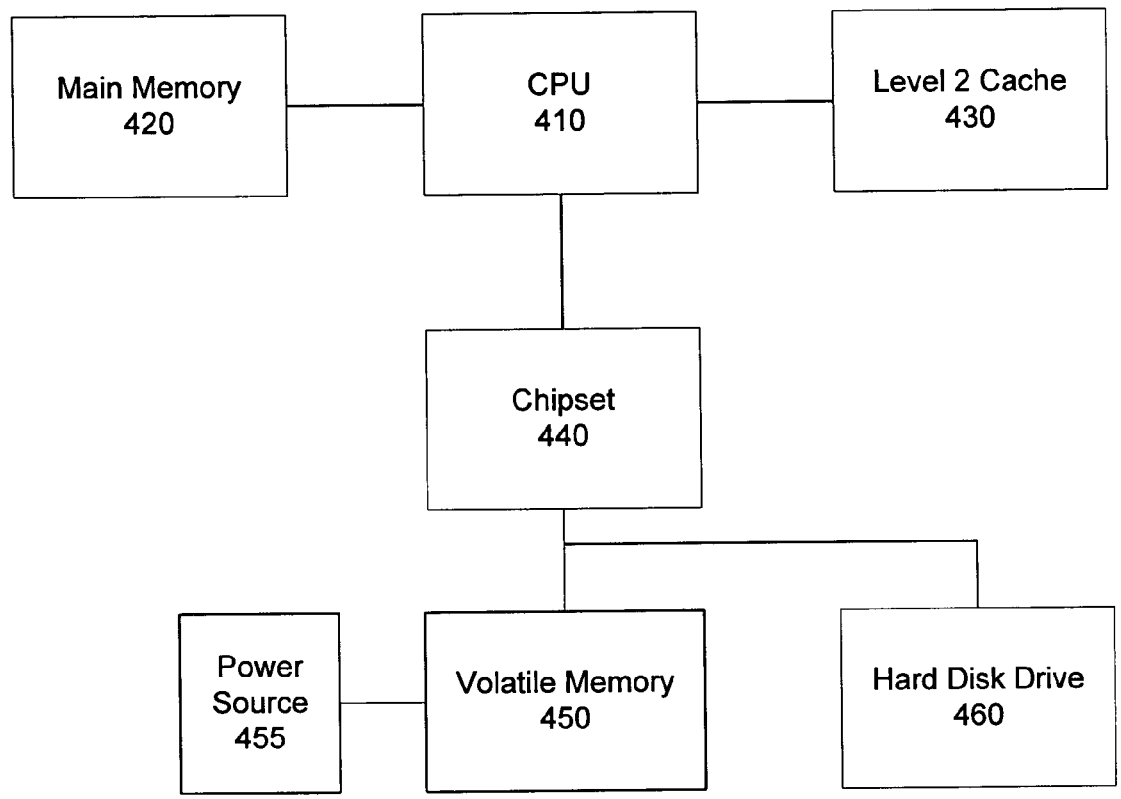
FIG. 4 is an embodiment of a computer system having a volatile memory for a hibernate process.

For yet another embodiment of the invention, FIG. 4 depicts a volatile memory that is used to store the system state during hibernation. CPU 410 is coupled to main memory 420, level 2 cache 430, and chipset 440. The CPU 410 may comprise an on-chip level 1 cache. The level 2 cache 430 temporarily stores data and instructions transferred to and from the CPU 410. Chipset 440 is coupled to a volatile memory 450 and a hard disk drive 460. A power source 455 is coupled to the volatile memory 450. Power source 455 may be a battery.

For this embodiment of the invention, when a request is made to place the system in the hibernation mode, the system state is stored to the hard drive 460 and the volatile memory 450. The power source 455 is used to keep the volatile memory 450 from losing its data contents when external power is removed. Therefore, when the system is awoken from hibernation, the system state may be loaded from the volatile memory 450.

Embodiments of the present invention may be implemented in hardware or software, or a combination of both. However, preferably, embodiments of the invention may be implemented in computer programs executing on programmable computer systems each comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion.

Each program may be implemented in a high level procedural or object oriented programming language to communicate with the computer system. However, the programs may be implemented in assembly or machine language, if desired. In any case, the language may be a compiled or interpreted language.

Each such computer program may be stored on a storage media or device (e.g., hard disk drive, floppy disk drive, read only memory (ROM), CD-ROM device, flash memory device, digital versatile disk (DVD), or other storage device) readable by a general or special purpose programmable computer system, for configuring and operating the computer system when the storage media or device is read by the computer system to perform the procedures described herein. Embodiments of the invention may also be considered to be implemented as a machine-readable storage medium, configured for use with a computer system, where the storage medium so configured causes the computer system to operate in a specific and predefined manner to perform the functions described herein.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A method, comprising:
   requesting that an operating system place a mobile computer system in a hibernation mode;
   gathering a state of the mobile computer system, wherein the state includes contents of a central processing unit of the mobile computer system and contents of a main memory of the mobile computer system;
   storing the state to a first non-volatile memory cache of the mobile computer systems, wherein the first non-volatile memory cache has a storage capacity between 50-2000 megabytes; and
   storing the state to a hard disk drive of the mobile computer system, which is coupled with the first non-volatile memory cache, via a transparent write-through process;
   putting the mobile computer system into the hibernation mode including putting the hard disk drive into the hibernation mode; and
   waking the mobile computer system from the hibernation mode including loading the state from the first non-volatile memory cache instead of from the hard disk drive.

2. The method of claim 1, wherein the state is gathered by the operating system.

3. The method of claim 1, wherein the hard disk drive has a greater storage capacity than the first non-volatile memory cache.

4. The method of claim 3, wherein the first non-volatile memory cache is logically coupled to the hard disk drive.

5. The method of claim 1, wherein the hard disk drive has the same address configuration as the first non-volatile memory.

6. A mobile computer system, comprising:
   a central processing unit (CPU);
   a main memory coupled to the CPU, wherein the main memory is to store data to be manipulated by the CPU;
   a first non-volatile memory cache of the mobile computer system coupled to the main memory, wherein the data is to be stored to the first non-volatile memory cache if the mobile computer system is placed in a hibernation mode, wherein the first non-volatile memory cache has a storage capacity between 50-2000 megabytes; and
   a hard disk drive of the mobile computer system coupled to the first non-volatile memory cache, wherein the hard disk drive has a greater storage capacity than the first non-volatile memory cache, wherein the data is to be stored to the hard disk drive if the mobile computer system is placed in a hibernation mode,
   wherein the data is to be restored from the first non-volatile memory cache instead of from the hard disk drive when the system is awaken from the hibernation mode.

7. The system of claim 6, wherein a state of the CPU is to be stored to the first non-volatile memory cache if the system is placed in the hibernation mode.

8. The system of claim 7, wherein the data and the state of the CPU are to be stored to the hard disk drive through a transparent write-through process.

9. The system of claim 6, further comprising:
   a driver coupled to the main memory and the first non-volatile memory cache, wherein the driver is to write the data to the first non-volatile memory cache.

10. The mobile computer system of claim 6, wherein the first non-volatile memory cache has a same address configuration as the hard disk drive.

11. An article comprising a machine readable medium having a plurality of machine readable instructions that when executed by a machine cause the machine to:

write contents of a central processing unit (CPU) to a non-volatile memory cache of the machine that has a same address configuration as a hard disk drive of the machine prior to the machine being placed in a hibernation mode;

write data from a random access memory to the non-volatile memory cache of the machine prior to the machine being placed in the hibernation mode;

write the contents of the CPU to the hard disk drive of the machine using a transparent write-through process; and initiate a load sequence from the non-volatile memory cache rather than from the hard disk drive after being awaken from the hibernation mode.

12. The article of claim 11, further comprising instructions that when executed cause the machine to:

restore the CPU contents.

\* \* \* \* \*

UNITED STATES PATENT AND TRADEMARK OFFICE
CERTIFICATE OF CORRECTION

| | | |
|---|---|---|
| PATENT NO. | : 7,412,565 B2 | Page 1 of 1 |
| APPLICATION NO. | : 10/643826 | |
| DATED | : August 12, 2008 | |
| INVENTOR(S) | : Wirasinghe et al. | |

It is certified that error appears in the above-identified patent and that said Letters Patent is hereby corrected as shown below:

In column 4, at line 49-53, delete "stored to the hard disk drive if the mobile computer system is placed in a hibernation mode, wherein the data is to be restored from the first non-volatile memory cache instead of from the hard disk drive when the system is awaken" and insert --restored from the first non-volatile memory cache instead of from the hard disk drive when the system is awoken--.

Signed and Sealed this

Tenth Day of March, 2009

JOHN DOLL
*Acting Director of the United States Patent and Trademark Office*